United States Patent [19]

Wolfelsperger et al.

[11] 3,952,643
[45] Apr. 27, 1976

[54] APPARATUS FOR COOKING FRENCH TOAST AND THE LIKE

[75] Inventors: Robert Wolfelsperger, Fairfield; Richard J. Bozzo, Wyckoff, both of N.J.

[73] Assignee: Sandco Limited, Ottawa, Canada

[22] Filed: Mar. 11, 1974

[21] Appl. No.: 449,703

[52] U.S. Cl. ................................. 99/337; 99/339; 99/352; 99/395; 99/443 C
[51] Int. Cl.² ............................................ A47J 37/06
[58] Field of Search .................... 99/337, 335–336, 99/339–340, 352–353, 354–355, 373–395, 404, 423, 427, 443 C; 198/34, 40, 234; 425/373

[56] References Cited
UNITED STATES PATENTS

| | | | |
|---|---|---|---|
| 1,869,539 | 8/1932 | Brand | 99/423 |
| 1,897,999 | 2/1933 | Brokvist et al. | 99/423 UX |
| 2,529,253 | 11/1950 | Hoffman et al. | 99/339 UX |
| 3,061,072 | 10/1962 | Schwertl | 198/34 |
| 3,154,187 | 10/1964 | Roth | 99/404 X |
| 3,267,877 | 8/1966 | Thiele et al. | 425/373 X |
| 3,363,080 | 1/1968 | Lamb et al. | 99/337 X |
| 3,427,171 | 2/1969 | Jeppson | 99/443 C X |
| 3,677,171 | 7/1972 | Levan | 99/443 C X |
| 3,718,487 | 2/1973 | Brunner | 99/423 X |

Primary Examiner—Stanley N. Gilreath
Assistant Examiner—Arthur O. Henderson
Attorney, Agent, or Firm—Harold L. Stults

[57] ABSTRACT

Method and apparatus for cooking products such as french toast in which the uncooked product is placed on one end of an endless steel belt upon which it is carried while being cooked. The product passes through a first cooking zone to cook it on one side, and it is then turned over and passes through a second zone in which it is cooked on the other side. The turning operation is performed by a flipper positioned between the two cooking zones which pushes spatula means under the product with a movement against the movement of the conveyor. The spatula is then swung about an axis transverse to the movement of the conveyor and directly above the cooking surface, and the product is turned or "flipped" along an arcuate path progressively with respect to the movement of the conveyor.

20 Claims, 9 Drawing Figures

APPARATUS FOR COOKING FRENCH TOAST AND THE LIKE

This invention relates to product processing systems where a process step is carried on with respect to one side of the product and the product is then inverted. More particularly, this invention relates to a system for cooking coated bread products, e.g., french toast and the like.

An object of this invention is to provide a system for cooking foods where one side of each product portion is cooked from one side and the portion is then inverted and it is cooked from the other side. A further object is to provide a completely automatic system for cooking coated bread products, e.g., french toast. Another object of the invention is to provide a process and apparatus for inverting products in an efficient and dependable manner with assurance that the handling will be gentle and precise so as to insure the maintenance of uniform high quality in the products. A further object is to provide for the above in such a way as to permit efficient and dependable operation at a high rate of speed. A still further object is to provide for the above with apparatus which is adaptable to various conditions of operation and use. These and other objects will be in part obvious and in part pointed out below.

As used herein, "french toast" means a slice of bread which has been coated or immersed in an egg-base liquid and then fried on both sides. The egg-base liquid softens the bread so that it is fragile and very much subject to damage, and it is hard to handle. It is first cooked on one side and then the other, and it is easily damaged even when the cooking is complete on one side. In accordance with the present invention, the slices of bread are coated and then placed upon an endless conveyor and cooked. They are passed through a first cooking zone where one side of each piece is cooked, and the pieces are then inverted and they pass through a second cooking zone where the other side is cooked. The fragile nature of the product makes it necessary to handle the product portions very carefully when they are being inverted. The apparatus includes safety features which prevent damaging the product and which stop the operation automatically if difficulties develop.

Referring to the drawings in which a system is shown which constitutes one embodiment of the invention.

Figure 1:
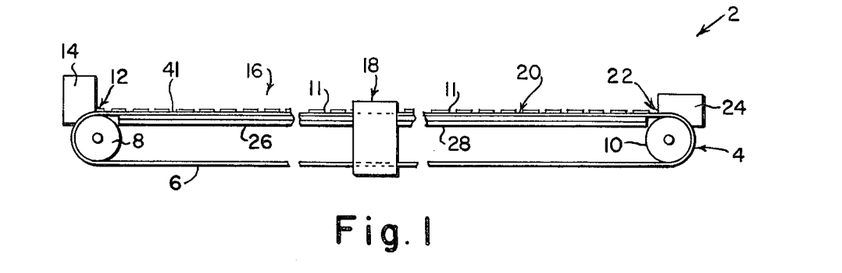
FIG. 1 is schematic side view of the system.

Referring to FIG. 1 of the drawings, the system 2 has an endless steel belt conveyor system 4 with a belt 6, the upper run of which moves from left to right, end pulley assemblies 8 and 10, and standard mounting and drive components which are not shown. During operation, product portions, e.g., french toast portions 11, are placed onto the left-hand end of the upper run of belt 6 at a receiving zone 12 utilizing a unit 14. The product is then carried through a first cooking zone 16 to a product inverting unit 18 and thence through a second product cooking zone 20 to discharge zone 22 where the product portions are removed by a unit 24. Positioned beneath belt 6 throughout zones 16 and 20 are gas heaters 26 and 28, respectively, which heat the belt and cook the respective bottom surfaces of each toast portion. Heaters 26 and 28 maintain precise temperature conditions within their zones, and the length of each of the zones and the speed of the belt are such that the toast is properly cooked on the first side in zone 16 and is then properly cooked on the second side in zone 20. The zones are adjacent at the product-inverting unit 18, and the inverting unit places each inverted portion back onto the belt in substantially the position which it occupied originally.

Figure 2:
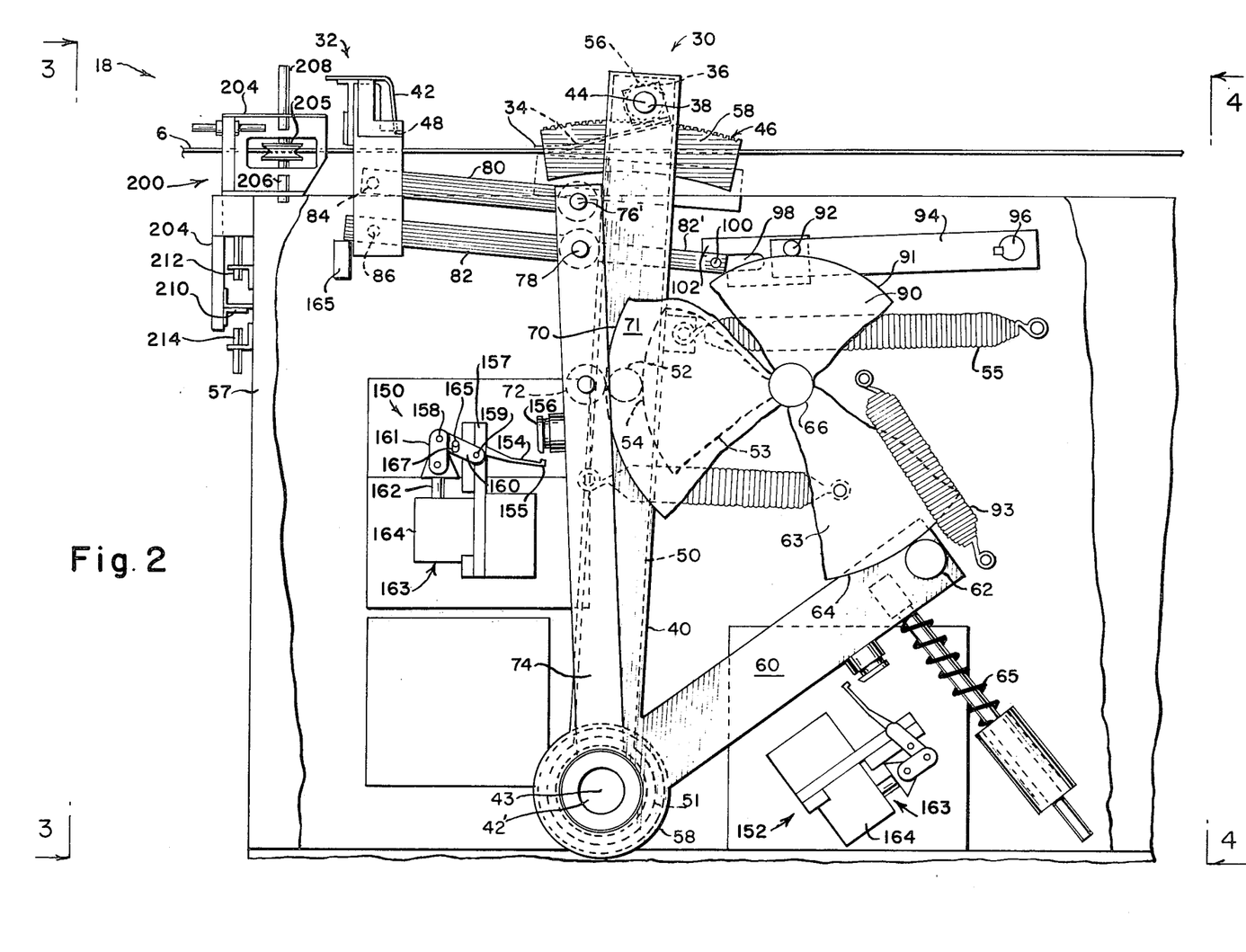
FIG. 2 is a side view of the "flipper" or product-inverting mechanism shown at the center portion of FIG. 1.
Figure 3:
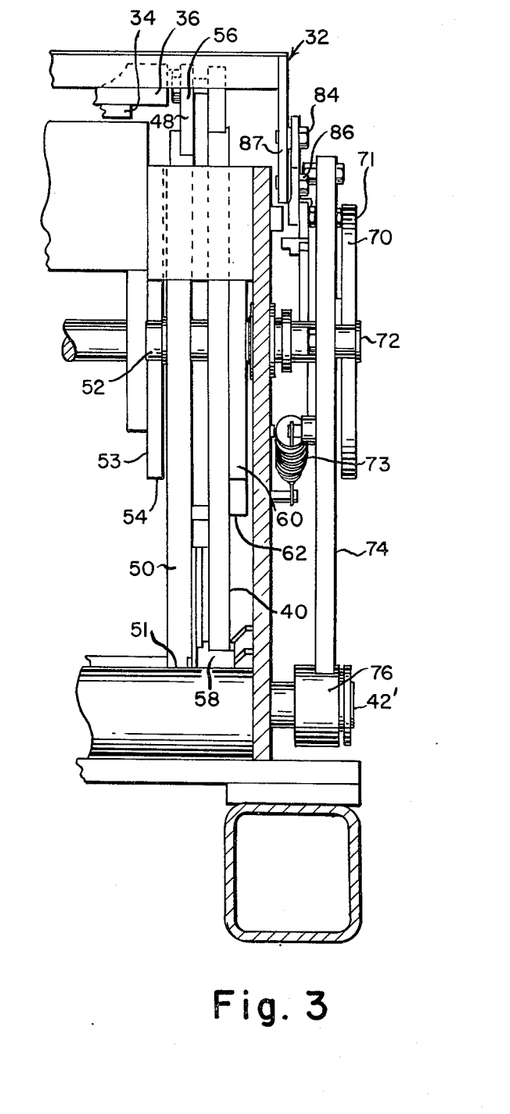
FIGS. 3 and 4 are views on the lines 3—3 and 4—4, respectively, on FIG. 2 with FIG. 3 showing only the mechanism at the right in FIG. 2.
Figure 4:
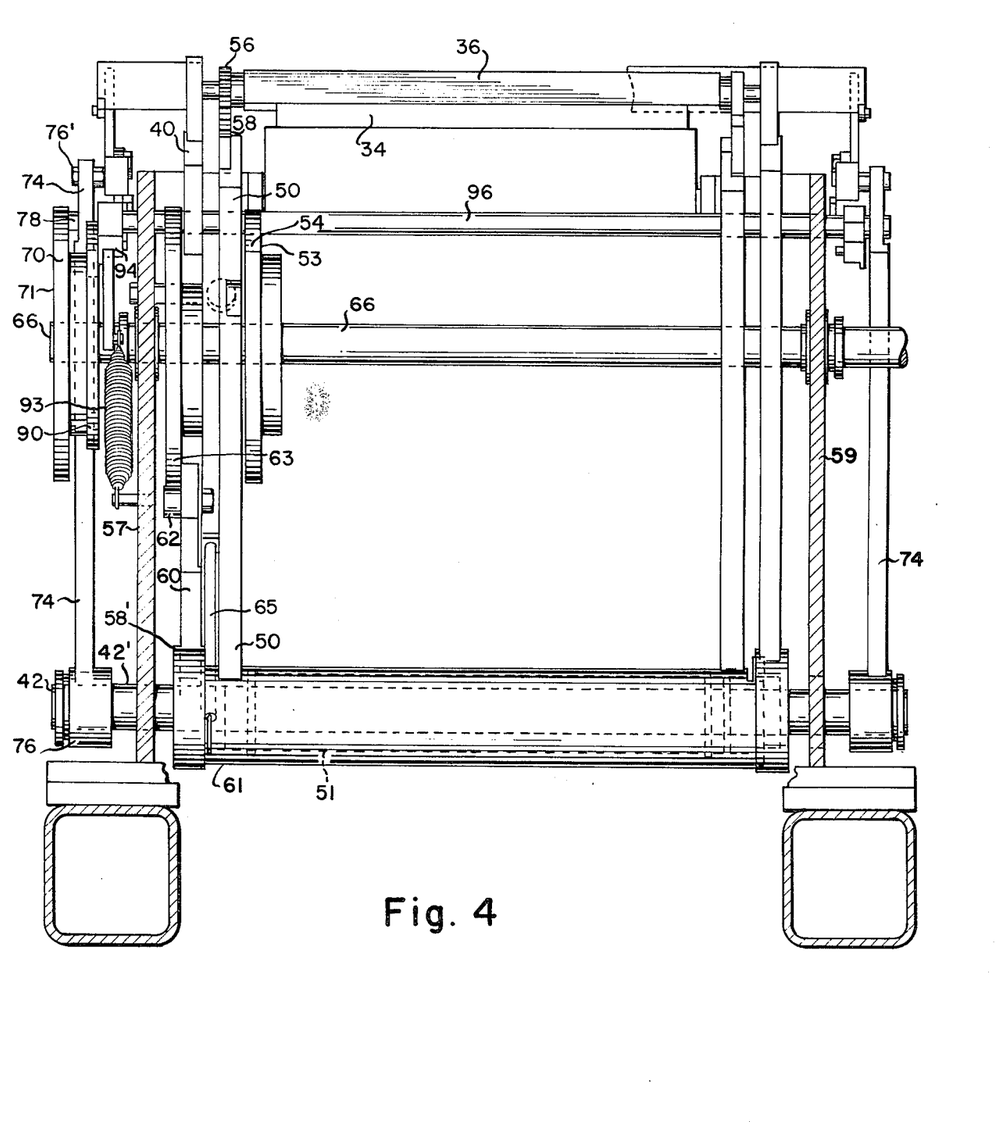

Referring to FIG. 2 of the drawings, unit 18 has a product-inverting unit 30 and a back-up and feeler bar assembly 32, both of which extend transversely over the top of the belt and are supported at their ends beyond the belt edges. Unit 30 is formed by an array of spatulas or sheet metal fingers 34 (see also FIG. 5) which are mounted in a single-plane alignment across the belt upon a square bar or shaft 36 having stub shafts 38 at its end by which it is journaled in a pair of vertical torque arms 40 upon the opposite sides of the belt. Spatulas 34 are shown in their product-receiving position against the belt surface. Hence, the spatulas are adapted to slide along the belt surface toward the left beneath a row of toast portions advancing from the left on the belt. Torque arms 40 are rigidly mounted at their lower ends upon the opposite ends of a tubular shaft 61 which is mounted on a shaft 42' (FIG. 4) journaled in side plates 57 and 59 about an axis 43 (FIG. 2). A cam follower arm 60 is also attached to shaft 61 and carries a cam follower roller 62 which is held by a compression spring 65 against the cam surface 64 of a cam plate 63 (a segment of which is shown) mounted upon a shaft 66. Hence, when cam plate 63 is rotated, arms 40 oscillate through an arc about axis 43 in a pattern determined by the contour of cam surface 64.

The rows of toast portions 11 (FIG. 5) are placed on the belt so that there is a narrow bare strip 41 of the belt surface between each row and the next. As a row of toast portions approaches the spatulas, the backup and feeler bar assembly is moved downwardly with the bottom edge 48 of a somewhat vertical strip or rake 42 moving toward the bare area or strip 41 of the belt surface behind the row of toast portions. Edge 48 is positioned upon or near the belt surface and the entire assembly 32 then moves with the belt, so that there is no relative movement between strip 42 and the belt. Hence, when the spatulas start to move to the left beneath the row of toast portions, the trailing edge of each toast portion is moving to the right directly ahead of strip 42 and the strip provides an upright backup surface which counteracts the tendency for any toast portion to slide to the left or to be turned or canted by its encounter with the spatulas. That insures the proper positioning of all of the toast portions on the spatulas. Assembly 32 is then raised and the spatulas are swung about the axis 44 of shafts 38, so that strip 42 and the spatulas are then up out of the path of the next row of toast.

After the initial rapid lifting movement by the spatulas, the turning movement proceeds at a decelerated rate which is such that the centrifugal forces resulting from the arcuate turning movement do not overcome the forces of gravity holding the toast portions on the spatulas, thus insuring that the toast portions maintain their proper positions on the spatulas. As the spatulas approach the vertical position, the rate of swinging movement is accelerated so that the spatulas swing downwardly at a rate sufficient to follow and maintain contact with the toast portions as they move to the product-discharging position. Hence, the toast portions are discharged and placed accurately in the inverted position on the belt surfaces. The spatulas are then swung at a very rapid rate from the product-discharging position back to the product-receiving position shown in FIG. 2. It is thus seen that the spatulas are first slid to the left, counter to the movement of the belt, and are then rotated or turned from their product-receiving position to their product-discharging position; and, they are turned back rapidly to their product-receiving position and also moved back in preparation for starting a new product-receiving cycle.

The turning of the product-inverting unit 30 is performed by a pair of gear assemblies mounted respectively upon the opposite sides of the belt, with each being between its belt edge and the adjacent arm 40. Each of these gear assemblies includes a gear 56 mounted upon the adjacent stub shaft 38, and an arcuate toothedrack or gear segment 58 meshing with its gear 56. Each gear segment is mounted upon the upper end of a torque arm 50, and each gear 56 is supported through its stub shaft which is journaled in its arm 40. Those arms are mounted at their lower ends to rock upon axis 43', arms 40 being upon tubular shaft 61 and arms 50 being upon a tubular shaft 51 which is journaled within tubular shaft 61. The torque arm 50 at the left in FIG. 4 carries a cam follower roller 52 (see also FIG. 2) which is held against the cam surface 54 of a cam plate 53 by tension spring 55. Hence, the rotation of cam plate 53 imparts oscillating swinging movement to gear segments 58 in accordance with the pattern determined by the contour of cam surface 54.

Figure 5:
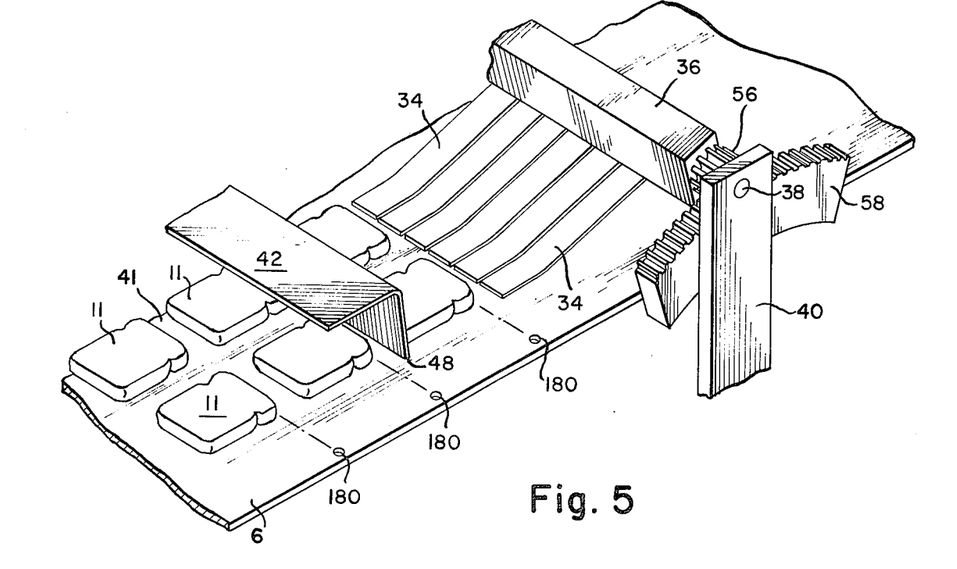
FIG. 5 is a somewhat schematic partial perspective view of the unit of FIG. 2.

Cam discs 53 and 63 are mounted upon a shaft 66, and the flipping or product-inverting operation is performed by the rotation of shaft 66. When torque arms 40 and 50 are moved together, there is no change in the relationship between each gear 56 and its gear segment 58 so that there is no resultant rotary movement of bar 36 and the spatulas. However, when there is relative movement of gears 56 to the right with respect to the gear segments, gears 56 rotate clockwise, and such relative movement to the left rotates gears 56 counterclockwise. The relative movement may be by either arms 40 or arms 50, or it may be by movement of both pairs of arms. With the spatulas positioned as shown in FIG. 5 with their left-hand edge portions resting on the belt surface, cam discs 53 and 63 start to swing their respective torque arms 50 and 40 to the left (FIG. 2) at the same rate. Hence, initially there is no relative movement between gears 56 and their respective gear segments 58, and no turning movement is imparted to bar 36 and the spatulas. That produces the insertion movement of the spatulas under the row of toast portions as discussed above. However, the spatulas move arcuately about axis 43' so that they move downwardly toward the belt as they move to the left, and that could cause the spatulas to exert excessive pressure upon the belt. To prevent that, the rate of movement of arms 40 and gears 56 relative to the gear segments is reduced slightly so that gears 56 turn a few degrees clockwise as the spatulas swing to the left. That slight turning movement of the gears maintains the spatulas substantially at the same angle to the belt, and the pressure between the spatulas and the belt is kept within acceptable limits. Arms 50 then move to the left while arms 40 remain stationary and that performs the product-inverting movement discussed above. It is thus seen that the controlled movements of torque arms 40 and 50 together and separately provides the product-inverting movement described above.

As indicated above, the back-up and feeler bar assembly 32 moves downwardly into contact with or near a bare strip of the belt surface directly behind each row of toast as the spatulas are moving beneath it, and the assembly moves with the belt and is then lifted. The assembly is then returned to the initial position from which it is moved downwardly behind the next row of toast. The horizontal movement, which is the movement while edge 48 is in contact with the belt and the corresponding return movement, is initiated from a cam surface 70 of a cam disc 71 which has a cam follower roller 72 carried on a vertical torque arm 74. A tension spring 73 is anchored to the machine frame and urges arm 74 clockwise so that roller 72 is held against cam surface 70. There are two torque arms 74 upon opposite sides of the belt, which are rigidly mounted at their lower ends upon collars 76, and which are mounted on and keyed to the ends of a shaft 42'. Hollow shaft 51 is journaled on shaft 42, and hollow shaft 61 is journaled on shaft 42 and surrounds hollow shaft 51. The two torque arms 40 and 50 at each side of the belt are positioned side-by-side with arm 50 being closest to the edge of the belt, and arm 74 is on the other side of the side plate (57 or 59).

Mounted upon the upper end of each of torque arms 74 by a pair of pivot bolts 76' and 78 are two parallel links 80 and 82 which are connected at their other ends by pivot bolts 84 and 86 to an end frame 87 of assembly 32. Each pair of links 80 and 82 provides a parallelogram relationship between its torque arm 74 and the adjacent end of assembly 32 so that assembly 32 maintains its vertical repose while arm 74 rocks through an arc about axis 43. Hence, strip 42 is held in its vertical position while moving to and from the belt surface and while in operative relationship with the belt. The vertical component of the movement of assembly 32 is produce by the action of a cam 90 (a segment of which is shown) through its cam surface 91 upon a cam follower roller 92. Roller 92 is mounted upon a cam follower arm 94 which is pivoted on the frame of the machine at its right-hand end on shaft 96, and a spring urges arm 94 counterclockwise. An identical arm 94 without the cam follower roller is positioned upon the opposite end of shaft 96 and both arms are keyed to the shaft so as to move together.

Link 82 of the parallelogram linkage has an extension 82' which terminates at the side of the left-hand end of arm 94. Arm 94 has a slot 98 which is in alignment with a roller 100 mounted upon the end of link extensison 82'; and there is an extension 102 on arm 94 which overhangs roller 100. Hence, when torque arm 74 moves to the right from the position shown, under the control of cam follower roller 72 riding on cam surface 70, link extension 82' is carried to the right and roller 100 enters slot 98. With that position of roller 100, link extension 82' is coupled to arm 94 so that the link extension is moved upwardly by the action of cam disc 90 on cam follower 92. That upward movement of the extension link moves the left-hand end of link 82 downwardly and carries with it the entire assembly 32 and the left-hand end of link 80. Thereafter, spring 93 holds roller 92 in contact with its cam, and produces downward movement of arm 94 which acts through link 82 to raise assembly 32 back to its elevated position. Cam disc 90 is mounted on and key to shaft 66 so that the two arms 94 move assembly 32 down and then up again in synchronism with the movements of torque arms, 40, 50 and 74. As indicated above, the parrellelogram arrangement provided by links 80 and 82 maintains unit 32 in its upright position, so that the movement of arms 94 produces vertical movement of assembly 32. For reasons to be discussed below, it is desirable to permit cam arm 94 to be raised without moving assembly 32. Accordingly, with link extension 82' positioned at the left of slot 98 as shown in FIG. 2, arm 94 can be moved upwardly by cam 90 acting through cam follower roller 92 without raising arm extension 82'.

The movement of unit 32 and its strip 42 discussed above is the composite action of the horizontal and vertical movement components which have now been described. At the beginning of a product inverting operation, torque arms 74 have been swung to their extreme left-hand position of FIG. 2. Torque arms 74 then start to move to the right so that roller 100 enters slot 98, and cam 90 then pushes roller 92 upwardly so as to move assembly 32 downwardly with the bottom edge 48 of strip 42 engaging the belt surface. During that time the contour of cam disc 70 is such that the upper end of arm 74 is moving to the right to make assembly 32 move at the same rate as the belt, and unit 32 moves with the arm so that there is no relative movement between the strip edge 48 and the belt surface. That condition is maintained during the time in which the spatulas are being inserted under the toast portions so that strip 42 performs its back-up function for the strip of toast portions. The contour of cam disc 90 is such that roller 92 moves down and assembly 32 is thereby lifted by the action of spring 93. As indicated above, that disengages edge 48 from the belt surface and moves unit 32 upwardly out of the path of the next row of toast.

Unit 32 also performs the very important feeler function of detecting any misalignment of the toast portions or any condition in which the inverting operation is not synchronized with the arrival of the lines of toast portions. Conditions of this type can prevent the inverting unit from operating properly, and the desired high quality of the products will not be maintained. In accordance with the present invention, if such an operating condition is created, it is detected and the inverting unit is rendered inoperative. In order to detect such a condition, strip 42 is swingably mounted so as to swing from its "home" position with respect to the end frames 87 whenever edge 48 encounters a toast portion as it moves downwards towards the belt. That relative swinging movement operates relays and thereby renders the inverting mechanism inoperative, i.e., "aborts" the inverting operations with the operating components in their "dwell" or "home" positions.

Figure 6:
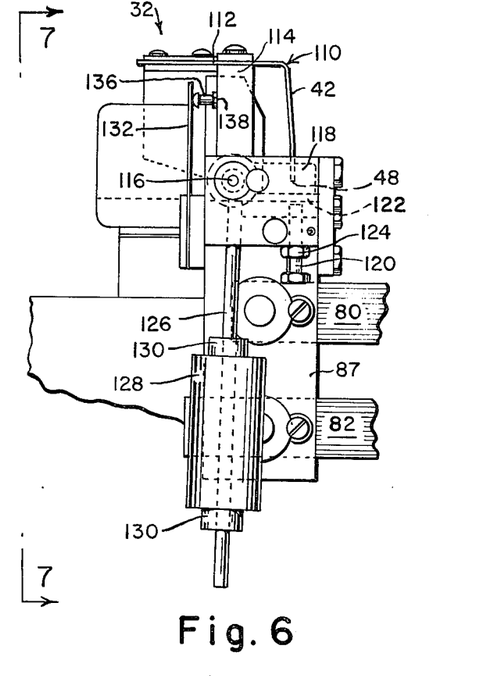
FIG. 6 is an enlarged view of a portion of FIG. 2 near the upper left-hand corner of the figure.
Figure 7:
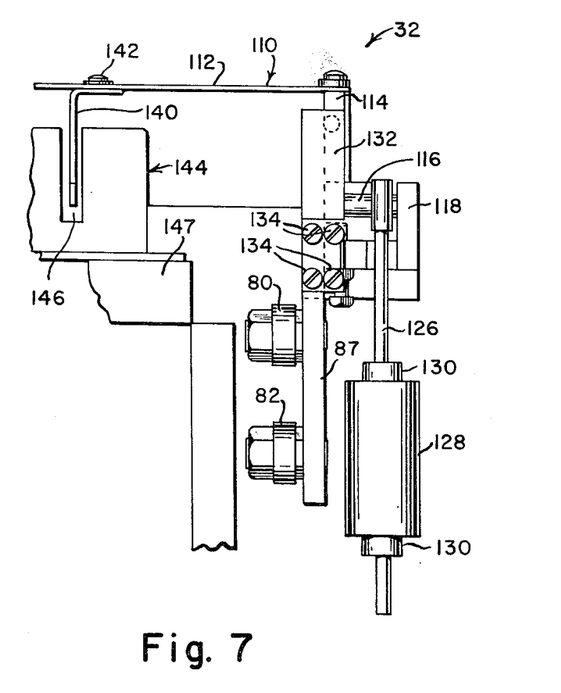
FIG. 7 is a sectional view on the line 7—7 of FIG. 6.

FIGS. 6 and 7 of the drawings show one of the two structures of unit 32 which support strip 42 at its ends, together with the other components which swing with it and form the strip assembly. Strip 42 is the vertical portion of an angle bar 110 which has a horizontal portion 112. Bar 110 is rockably mounted at its ends on a pair of arms 114, each of which carries a stub shaft 116 which is journaled at its end in a bracket 118. Bracket 118 is in turn mounted on end frame 87, which has been discussed above as being supported by links 80 and 82 from torque bar 74. The entire bar assembly is adapted to swing counterclockwise from the "home" position shown, but it is restrained from clockwise movement by stop screw 120. Screw 120 is threaded through bracket 118 with its upper end being normally engaged by the bottom surface of a horizontal extension 122 of arm 114, and a lock nut 124 is tightened to hold screw 120 in adjusted position. Stop screws 120 prevent clockwise movement of bar 110 when the bar is in contact with the belt and insures the proper functioning as a backup strip for the toast portions. They also prevent objectionable swinging movement of the bar assembly.

Mounted on shaft 116 and clamped thereto is a threaded rod 126 which extends through a bore in a counterweight 128, and a pair of threaded collars 130 clamp the counterweight in adjusted position on the rod. Hence, the counterweights and rods at the ends of unit 32 act in pendulum fashion with respect to shafts 116. There is also a left spring 132 clamped to end frame 87 by screw 134 which exerts a controlled restraint to the counterclockwise swinging movement. A screw 136 is threaded into arm 114 with its head resting against the top of spring 132, and has a lock nut 138, so that the restraining force of 132 is adjustable through a wide range by turning screw 136. The position of screw 136 controls the initial restraining force of the spring, and the characteristics of the spring determine the rate at which its restraining force increases during progressive swinging movement.

Weight 128 is adjustable along the length of rod 126 to match the weight of the swinging bar assembly, and the annular adjustment of rod 126 upon shaft 116 is used to match the shift of the center of gravity of the swinging bar assembly. When the entire swinging assembly has been balanced, screws 136 are turned to adjust the pressure of springs 132 to provide a slight pressure clockwise around the axis of shafts 116 toward the belt, thus overcoming that balanced condition and urging the bar assembly against the stop screws 120. During operation, any product which is beneath edge 48 will produce sufficient resistance to movement of strip 42 to overcome the pressure of springs 132, and will swing the bar assembly counterclockwise around the axis of shafts 116. The combination of the counterweights and springs 132 provides at the ends of the bar assembly a very carefully controlled initial restraint to counterclockwise movement which is of a low enough order to prevent edge 48 from engaging a toast portion with sufficient force to damage the product or to clamp a corner or edge portion to the belt. It is thus seen that bar 110 normally remains in its "home" position with respect to end frame 87, even while assembly 32 is being moved vertically and horizontally as discussed above. But that whenever edge 48 encounters an obstruction to its downward movement it swings counterclockwise.

The counterclockwise swinging movement of bar 110 is detected by a vane switch 144 mounted on the machine frame 147, and a soft iron vane 140 mounted on the horizontal portion 112 of bar 110 by a pair of screws 142. Switch 144 has an air gap 146 with a transverse magnetic field through which vane 140 swings when bar 110 moves from the position shown. That causes switch 144 to energize a relay which closes a normally open switch (not shown), the closing of which (see FIG. 2) completes the circuits through the solenoids of three lockout units which latch out arms 74, 50 and 60, respectively. Lockout units 150 and 152 are for arms 74 and 60, respectively (the identical one for arm 50 is not shown). Each lockout unit has a latch arm 154 which extends through an opening in a bracket 157 mounted on the frame side plate 57, and is adapted to engage its latch end 155 with a latch bracket 156 mounted on arm 74. Latch arm 154 is pivoted at its left-hand end by a pin 158 to two arms 160 at its sides which are pivoted at their right-hand ends by bolts 159 to bracket 157. Pin 158 also connects latch arm 154 and arms 160 to two links 161 which extend downwardly and are connected to the armature 162 of a solenoid unit 163 having a solenoid 164. A pin 165 is mounted in latch arm 154 and its ends extend into arcuate slots 167 in arms 160 so that the latch arm has a limited swinging movement with respect to arm 160. A spring (not shown) is positioned beneath latch arm 154 at the left of bolt 159 and is nested at its end in recesses respectively in the latch arm and bracket 157. The spring urges the latch arm upwardly about pin 158 so that pin 165 is at the top of slot 167. In the drawing solenoid 164 is de-energized so that armature 162 is held up out of the solenoid by the spring acting through latch arm 154, pin 158 and link 161. When solenoid 164 is energized, the armature is drawn down, thus acting through link 161 and pin 158 to swing arms 160 and latch arm 154 counterclockwise around the bolt 159. However, the latch arm is still urged upwardly by the spring so that its pin 165 is at the top of slots 167. If arm 74 is near its extreme left-hand position, its latch end 155 engages latch bracket 156 and holds torque arm 74. The latch end 155 draws arm 74 slightly to the left so that its cam follower roller 72 is lifted from cam surface 70.

Figure 9:
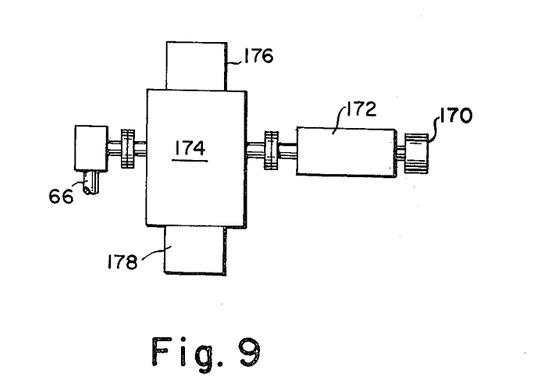
FIG. 9 is a schematic representation of the drive for the unit of FIGS. 2 through 8.

As indicated above, the entire product inverting sequence is carried on by the cam discs mounted on shaft 66. Those cam discs synchronize the operations of the inverting and feeler and backup bar operations, and a very important aspect of the invention is to maintain those operations synchronized with the positioning of the rows of toast on the belt surface. Accordingly, when the lockout units are energized, as discussed above, all of the operations produced by the cams mounted upon shaft 66 are stopped without stopping the rotation of the shaft. Hence, shaft 66 and its cams continue to operate in synchronism with the belt so that the properly timed operations will be restarted when the torque arms are released. The accurate control of the rotation of shaft 66 is provided from a tachometer 170 (see FIG. 9) which is synchronized with the main drive motor for belt 6, and which provides slave motor control upon the drive motor 172 for shaft 66. Motor 172 drives shaft 66 through a differential unit 174 which has two correction motors 176 and 178 which turn in opposite directions and are operative to increase or decrease the output rotation of differential unit 174. One edge of belt 6 has a row of perforations 180 (see FIG. 5) which are spaced the same as the spacing desired between the leading edges of adjacent rows of toast. Perforations 180 are used to control the depositing of the rows of toast on the belt by unit 14 so that in normal operation there is a row of toast precisely positioned on the belt relative to each perforation in the belt.

Referring to the upper left-hand portion of FIG. 2, an assembly 200 is positioned a predetermined distance upstream from the inverting unit, and performs the function of providing synchronizing signals which indicate that successive rows of toast portions are approaching the inverting unit. Assembly 200 is mounted upon side plate 57 and includes a bracket 204 which is slidable to and from the belt, and a spring (not shown) urges the bracket horizontally towards the edge of the belt. Mounted upon bracket 204 is a horizontal-axis roller 205 which has a V-groove into which the edge of the belt projects. Hence, the roller rides on the edge of the belt so that bracket 204 is always in a specific relationship with respect to the edge of the belt. Supported by bracket 204 respectively above and below the belt are the two units 206 and 208 of an electric eye system which projects a beam of light vertically toward the belt in alignment with the row of perforations 180 and detects the passing of each perforation and produces synchronizing signals in a manner known in the art.

Mounted upon the lower portion of bracket 204 is a shield 210 which cooperates with an electric eye assembly formed by units 212 and 214 both mounted upon side plate 57. Shield 210 normally intercepts the beam of light of the electric eye assembly which indicates that belt 6 is in proper transverse alignment. However, any deviation of the belt from proper alignment is detected, and correction steps are taken in a manner known in the art. Each synchronizing signal of units 206 and 208 is utilized by the master control unit to determine whether or not the operations performed by the cam plates on shaft 66 are synchronized with the position of the next row of toast to be inverted. Any slight departure from "fine tuned registration" is instantly detected and the appropriate correction is made by one or the other of the correction motors. That is, shaft 66 and its cams are speeded up or slowed down to compensate for any small change in the rate at which the belt moves.

Figure 8:
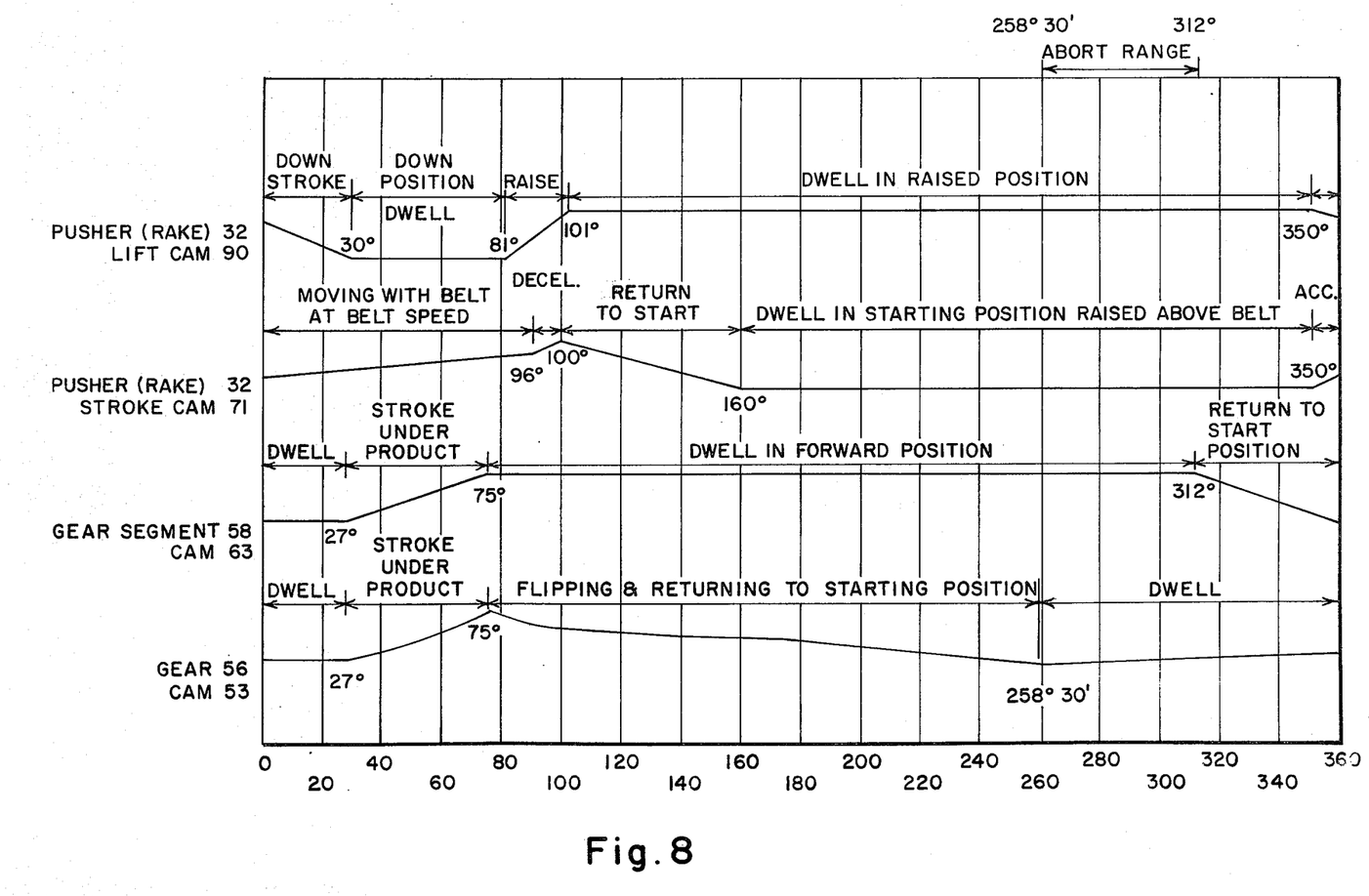
FIG. 8 is a timing diagram illustrating the mode of operation.

Referring to the timing diagram of FIG. 8, the nomenclature explains the movements performed by the four cams 90, 71, 63 and 53 in terms of degrees or turning movement of shaft 66 during one complete revolution, starting at the "zero" or "home" position when unit 32 is elevated and has just started to move parallel to and at the same speed as the belt. The degrees in the discussion below are the angles the cams have turned from the home posistion. Unit 32 has also started to drop toward the belt, and edge 48 contacts the belt at 30°, and remains in contact with the belt for 51°, and is then raised during the next 20°. Cam 71 imparts the constant movement of unit 32 with the belt to 96° and then decelerates and stops the unit at 100°. Cam 71 then moves unit 32 at a constant rate for 60° back to the home position where it remains to 350°. At 350° the movement of unit 32 in the belt direction is started, and simultaneously cam 90 starts the downward movement of the unit.

Gear segments 58 and gears 56 remain stationary from 0° to 27° and then are moved together from 27° to 75° to insert the spatulas under the toast portions. It should be noted that at that time units 32 is still in contact with the belt so as to provide the backup pusher effect urging the toast portions in proper alignment into the spatulas. Also, as explained above, cam 53 moves gears 56 at a slightly slower rate than gear segments 58 are moved by cam 63, so that the gears turn clockwise at a rate sufficient to prevent the spatulas from exerting excessive pressure on the belt. Gear segments 58 then remains stationary in their left-hand position from 75° to 95° to provide the initial rapid lifting of the toast portions. Cam 53 then gradually decelerates gear 56 from 90° so as to insure that the toast portions will remain properly positioned on the spatulas. Cam 53 then accelerates the movement of gear 56 to insure that the spatulas follow the toast portions in the downward movement, thus insuring that the toast portions are kept in alignment and are positioned in the proper spaced relationship on the belt.

The spatulas reach their "full-flip" or product-discharging position at 258½°, and cam 53 imparts no further movement to gear 56 through the remainder of the cycle. At 258½° cam 58 is at its "high" which is its "home" position, but the spatulas are still in their "full-flip" or product-discharging position. From 258½° to 312°, all of the cams are of unchanging radius so that gears 56 and gear segments 58 do not move. That produces a "dwell" period in the cycle during which the bar assembly is elevated and at the left, and the spatulas are in their product-discharging position. As indicated above, the inverting operation can be stopped then, and the spatulas and other components are exposed for inspection and cleaning, and for adjustment or repair when necessary. The torque arms 40, 50 and 74 are at their maximum radius from the axis of shaft 66 so that they can be locked out by units. Simultaneously, the controls set off an alarm signal to call the operator's attention to the fact that difficulty has arisen. When the difficulty has been cleared, the operator pushes a button which releases the latches and restarts the inverting operations. However, the controls release the latches only during the "dwell" period so that the cam follower rollers are eased onto their respective cam surfaces. It should be noted that the timing diagram represents the cam contours on the respective cams. However, the specific contours, of cam surface are determined in accordance with the most efficient and dependable operation for the specific product, all in accordance with the discussion above. At the end of the cycle between 312° and 360°, gear segments 58 are moved to the right while gears 56 and bar 36 are not moved, and that rotates the gears counterclockwise so as to return shaft 36 and the spatulas to their "home" positions. Hence, the components are positioned to start a new cycle.

Although an illustrative embodiment of the present invention has been described herein with reference to the accompanying drawings, it is to be understood that the invention is not limited to this precise embodiment and that various changes and modifications may be effected therein by one skilled in the art without departing from the scope or spirit of this invention.

What is claimed is:

1. In a system for cooking individual food products, the combination of an endless belt having a product-carrying run with a product-supporting surface upon which the product is carried from a product-receiving station to a product-discharge station, means to deposit product portions on said surface in a predetermined relationship at said product-receiving station, inverting means positioned generally intermediate said stations and adapted to invert the product portions within a product-inverting zone, heating means to subject the product portions to cooking upon one side when upstream from said inverting means and upon the other side when downstream from said inverting means, said endless belt having indicating means spaced longitudinally therealong, first detector means at said product-receiving station which is responsive to moment thereby of said indicating means and which controls the positioning of said product portions upon said belt, second detector means upstream from said product-inverting zone which is responsive to movement thereby of said indicating means and which controls said inverting means, said first detector means being utilized to determine the relative position of each product portion longitudinally of said belt and said second detector means acting in response to the arrival of each product portion at said product-inverting zone to operate said inverting means.

2. In a system for cooking individual food products, the combination of an endless belt having a product-carrying run with a product-supporting surface upon which the product is carried from a product-receiving station to a product-discharge station, means to deposit product portions on said surface in a predetermined relationship at said product-receiving station, inverting means positioned generally intermediate said stations and adapted to invert the product portions within a product-inverting zone, heating means to subject the product portions to cooking upon one side when upstream from said inverting means and upon the other side when downstream from said inverting means, said endless belt having indicating means spaced longitudinally therealong, and comprising a continuous series of perforations each of which is spaced in a predetermined relationship longitudinally of the belt with respect to an area of the belt upon which a product portion is deposited, first detector means at said product-receiving station which is responsive to said indicating means and which controls the positioning of said product portions upon the said belt, second detector means upstream from said product-inverting zone which is responsive to said indicating means and which controls said inverting means, said first detector means being utilized to determine the relative position of each product portion longitudinally of said belt and said second detector means acting in response to the arrival of each product portion at said product-inverting zone to operate said inverting means.

3. A system as described in claim 2 wherein said second detector means is an electric eye assembly positioned with respect to said inverting means so as to produce a signal resulting from a light beam passing through one of said perforations.

4. A system as described in claim 3 wherein said product portions are placed on said surface in rows which are transverse of the belt and are spaced from each other, and control means to detect the proper positioning of product portions including a feeler having a bottom surface which is moved toward the belt surface at a time in the operating cycle during which the strip of the belt surface between two adjacent rows of product portions is beneath the feeler.

5. A system as described in claim 4 wherein said feeler acts as a back-up means directly behind a row of product portions, means to move said feeler with said belt surface for a predetermined distance.

6. A system as described in claim 5, wherein said inverting means includes spatula means which is moved downwardly into contact with said belt surface directly ahead of each row of product portions, and means projecting said spatula means counter-direction with respect to the movement of said belt surface whereby said spatula means moves under the product portions and said feeler prevents objectionable counter-direction movement of the product portions.

7. In a system as described in claim 2 which includes a feeler assembly formed by a feeler and a weighted arm assembly supporting said feeler and adapted to move said feeler toward and from said belt surface in areas between product portions whereby said feeler detects the improper positioning of a product portion, said arm assembly having a gravity biasing force and spring means which exerts an additional biasing force.

8. Apparatus as described in claim 7, wherein said spring means is a leaf spring exerting its biasing force against the action of the gravity biasing force of said weighted arm assembly.

9. Apparatus as described in claim 8 wherein said feeler member is an angle bar and wherein said mounting means includes pivot means forming a rocking pivot substantially at the level of the bottom edge of said feeler member, and wherein said weighted arm assembly has a weight and an arm which extends downwardly from said rocking pivot at a small angle to the vertical, and threaded means to adjust said weight vertically on said arm.

10. Apparatus as described in claim 8 which includes a vane and wherein said relative movement of said feeler member is detected by said vane and said vane is moved to and from a position wherein it intersects a beam of light, and a photoelectric cell unit which is responsive to said beam of light.

11. In a system for cooking individual food products, the combination of an endless belt having a product-carrying run with a product-supporting surface upon which the product is carried from a product-receiving station to a product-discharge station, means to deposit product portions on said surface in a predetermined relationship at said product-receiving station, inverting means positioned generally intermediate said stations and adapted to invert the product portions within a product-inverting zone, heating means to subject the product portions to cooking upon one side when upstream from said inverting means and upon the other side when downstream from said inverting means, said endless belt having indicating means spaced longitudinally therealong, first detector means at said product-receiving station which is responsive to said indicating means and which controls the positioning of said product portions upon said belt, second detector means upstream from said product-inverting zone which is responsive to said indicating means and which controls said inverting means, said first detector means being utilized to determine the relative position of each product portion longitudinally of said belt and said second detector means acting in response to the arrival of each product portion at said product-inverting zone to operate said inverting means and wherein said product portions are placed on said belt surface with longitudinal spaces between them, and which includes a feeler and means to move said feeler toward said belt surface directly behind the trailing edge of each product portion as it moves into said product-inverting zone whereby the improper positioning of the product portions with respect to the operation of said inverting means is detected by said feeler.

12. In a system for cooking individual food products, the combination of an endless belt having a product-carrying run with a product-supporting surface upon which the product is carried from a product-receiving station to a product-discharge station, means to deposit product portions on said surface in a predetermined relationship at said product-receiving station, inverting means positioned generally intermdiate said stations and adapted to invert the product portions with a product-inverting zone, heating means to subject the product portions to cooking upon one side when upstream from said inverting means and upon the other side when downstream from said inverting means, said endless belt having indicating means spaced longitudinally therealong, first detector means at said product-receiving station which is responsive to said indicating means and which controls the positioning of said product portions upon said belt, second detector means upstream from said product-inverting zone which is responsive to said indicating means and which controls said inverting means, said first detector means being utilized to determine the relative postion of each product portion longitudinally of said belt and said second detector means acting in response to the arrival of each product portion at said product-inverting zone to operate said inverting means and which includes back-up means for the product portions as each product portion encounters said inverting means.

13. In a system of the character described, an endless belt having a product-carrying run with a top surface upon which the product is deposited and carried downstream at a controlled rate from a product-receiving station to a product-discharging station, means to deposit product portions on said surface at said product-receiving station, means to remove the product at said product-discharging station, inverting means positioned at an inverting zone generally intermediate said stations and adapted to invert portions of the product, treating means to treat one side of the product portions within a first zone upstream from said inverting zone and to treat the other side of the product portions within a second zone downstream from said inverting zone, the length and speed movement of said belt and the position of said inverting means longitudinally of said belt being such that each side of each product portion is properly treated, said inverting means comprising means to move upstream along said surface and under successive product portions so as to lift each product portion from said surface and to swing the product along an inverting path above said surface without movement transversely of the movement of said surface and to deposit each portion thus inverted downstream upon said surface, and means to synchronize the depositing of the product portions on said top surface and the movement of the belt and with the operation of said product-inverting means.

14. In a system of the character described, an endless belt having a product-carrying run with a top surface upon which the product is deposited and carried downstream at a controlled rate from a product-receiving station to a product-discharging station, means to deposit product portions on said surface at said product-receiving station, means to remove the product at said product-discharging station, inverting means positioned at an inverting zone generally intermediate said stations and adapted to invert the product portions, treating means to treat one side of the product portions within a first zone upstream from said inverting zone and to treat the other side of the product portions within a second zone downstream from said inverting zone, the length and speed of movement of said belt and the position of said inverting means longitudinally of said belt being such that each side of each product portion is properly treated, said inverting means comprising means to move upstream along said surface and under successive product portions so as to lift each product portion from said surface and to swing the product along an inverting path above said surface without movement transversely of the movement of said surface and to deposit each portion thus inverted downstream upon said surface, means to synchronize the depositing of the product portions on said top surface and the movement of the belt with the operation of said product-inverting means, and wherein said belt is a steel belt bearing signal means along one edge thereof, said signal means being spaced from each other substantially the distance between the leading edges of adjacent product portions, said means to deposit the product portions upon said top surface placing each of the product portions in a predetermined relationship with respect to one of said signal means, and means to operate said product-inverting means in accordance with the position of one of said signal means whereby the inverting operation is synchronized with the arrival of each product portion at said inverting zone.

15. In a system for cooking products such as french toast or the like, the combination of an endless steel belt having a product cooking run with a top surface upon which product portions are deposited at a product-receiving station and from which the product portions are removed at a product-discharging station, means to position product portions on said belt in a predetermined longitudinal relationship, inverting means to invert the product portions at an inverting zone which is generally intermediate said stations, means to heat said belt from its underside between said stations whereby product portions are cooked upon their undersides, first drive means to drive said belt at a controlled rate whereby the bottom sides of the product portions are cooked upstream from said inverting zone and the other sides are cooked downstream from said inverting zone, the length and speed of movement of said belt and the position of said inverting means longitudinally of said belt being such that each side of each product portion is properly cooked, second drive means to operate said inverting means, and control means to control the operation of said second drive means as a slave drive from said first drive means whereby the operation of said inverting means is controlled with respect to the movement of said belt and to operate said inverting means synchronously with respect to the arrival of product portions at said inverting zone.

16. In a system of the character described, the combination of: an endless belt having a product-carrying run with a top surface upon which the product is deposited and carried downstream from a product-receiving station to a product-discharging station, means to deposit product portions on said surface at said product-receiving station, means to remove the product at said product-discharging station, inverting means positioned at an inverting zone generally intermediate said stations and adapted to invert portions of the product, treating means to treat one side of the product within a first zone upstream from said inverting zone and to treat the other side of the product within a second zone downstream from said inverting zone, said inverting means comprising means to move upstream along said surface and under successive product portions so as to lift each product portion from said surface and to swing the product along an inverting path above said surface and to deposit each portion thus inverted downstream upon said surface, back-up means adapted to move to and from a position upstream and adjacent each product portion when the product portion is engaged by said inverting means to thereby restrain upstream movement of the product portion, and means to impart said movement to said back-up means.

17. In a system for cooking individual food products, the combination of, an endless belt having a product-carrying run with a product-supporting surface upon which the product is carried from a product-receiving station to a product-discharge station, means to deposit product portions on said surface at said product-receiving station with longitudinal spaces between them, inverting means positioned generally intermediate said stations and adapted to invert the product portions within a product-inverting zone, a feeler and means to move said feeler toward said belt surface directly behind the trailing edge of each product portion as it moves into said product-inverting zone whereby the improper positioning of the product portions with respect to the operation of said inverting means is detected by said feeler, heating means to subject the product portions to cooking upon one side when upstream from said inverting means and upon the other side when downstream from said inverting means, control means at said product-receiving station which controls the positioning of each of said product portions upon said belt in a predetermined relationship with respect to indicating means at a control portion of said belt, detector means positioned in a predetermined relationship along the path of said belt relative to said product-inverting zone responsive to said indicating means and which controls said inverting means, said control means being utilized to determine the relative position of each product portion longitudinally of said belt and said detector means acting in response to the arrival of each product portion at said product-inverting zone to operate said inverting means and wherein said product portions are placed on said belt surface.

18. In a system as described in claim 17 wherein said inverting means comprises spatula means which is adapted to move to a product-receiving position wherein one edge engages said belt surface directly ahead of the leading edge of each product portion as it moves into said inverting zone, and means to move said spatula means to said product-receiving position and thence in the direction opposite to the direction of movement of said belt.

19. In a system as described in claim 17 wherein said feeler acts to prevent movement of said product portions when being engaged by said inverted means.

20. In a system of the character described, the combination of, an endless belt having a product-carrying run with a product-supporting surface upon which the product is carried from a product-receiving station to a product-discharge station, means to deposit product portions on said surface in a predetermined relationship at said product-receiving station, inverting means positioned generally intermediate said stations and adapted to invert the product portions within a product-inverting zone, treating means to treat the product portions upon one side when upstream from said inverting means and upon the other side when downstream from said inverting means, said endless belt having indicating means spaced longitudinally therealong, control means at said product-receiving station which is responsive to said indicating means and which controls the positioning of said product portions upon said belt, detector means positioned along the path of said belt in a predetermined relationship with respect to said product-inverting zone and responsive to said indicating means and which controls said inverting means, said control means being utilized to control the relative position of each product portion longitudinally of said belt and said detector means acting in response to said indicating means to determine the arrival of each product portion at said product-inverting zone and to operate said inverting means, and feeler means to move to said belt surface in trailing relationship with respect to each product portion and to act as back-up means for the product portions as each product portion encounters said inverting means.

* * * * *

UNITED STATES PATENT OFFICE
CERTIFICATE OF CORRECTION

Patent No. 3,952,643             Dated April 27, 1976

Inventor(s) Robert Wolfelsperger and Richard J. Bozzo

It is certified that error appears in the above-identified patent and that said Letters Patent are hereby corrected as shown below:

Claim 1 (column 10, line 5) "moment" should read

---movement---.

Signed and Sealed this

*Fourth* Day of *October 1977*

[SEAL]

*Attest:*

RUTH C. MASON        LUTRELLE F. PARKER
*Attesting Officer*      *Acting Commissioner of Patents and Trademarks*